United States Patent [19]
Kutner

[11] Patent Number: 5,489,943
[45] Date of Patent: Feb. 6, 1996

[54] ONE-PASS ADAPTIVE BIT RATE CONTROL

[75] Inventor: Michael A. Kutner, Mountain View, Calif.

[73] Assignees: Sony Corporation, Tokyo, Japan; Sony Electronics, Park Ridge, N.J.

[21] Appl. No.: 196,050

[22] Filed: Feb. 14, 1994

[51] Int. Cl.⁶ .................................................. H04N 7/30
[52] U.S. Cl. ........................ 348/405; 348/419; 348/700
[58] Field of Search ................................. 348/419, 405, 348/700; H04N 7/133

[56] References Cited

U.S. PATENT DOCUMENTS

5,038,209   8/1991   Hang ............................... 348/419

Primary Examiner—Howard W. Britton
Attorney, Agent, or Firm—Pasquale Musacchio; Jerry A. Miller

[57] ABSTRACT

A one pass adaptive bit rate control method. Data from a previous video field is used to calculate a quantizer scale factor for use in compressing a current video field. Large changes in compressed data size is used to detect scene changes. When a scene change is detected, a marker is inserted into the compressed data stream in place of the compressed field. An interpolated field is substituted during decompression for the scene change marker.

33 Claims, 4 Drawing Sheets

ONE-PASS ADAPTIVE BIT RATE CONTROL

This application is related to an application entitled "Random Access Audio/Video Processor with Multiple Outputs," to David Rossmere, Robert Glenn, Jr., William Brown, John Carluci and Robert Duffy, Ser. No. 08.196.018, filed Feb. 14. 1994; and to an application entitled Random Access Audio/Video Processor with Compressed Video Resampling to allow Higher Bandwidth Throughput," by David Rossmere, Robert Glenn, Jr., William Brown, John Carluci and Robert Duffy, Ser. No. 08/196,038, filed Feb. 14, 1994. Both of these applications are hereby incorporated by reference.

BACKGROUND

1. Field of the Invention

This invention relates generally to the field of data compression. More particularly, this invention relates to a method and apparatus for data compression using adaptive bit rate control which is particularly well suited for compression of video data which should be maintained at an approximately constant compressed data size.

2. Background of the Invention

Figure 1:
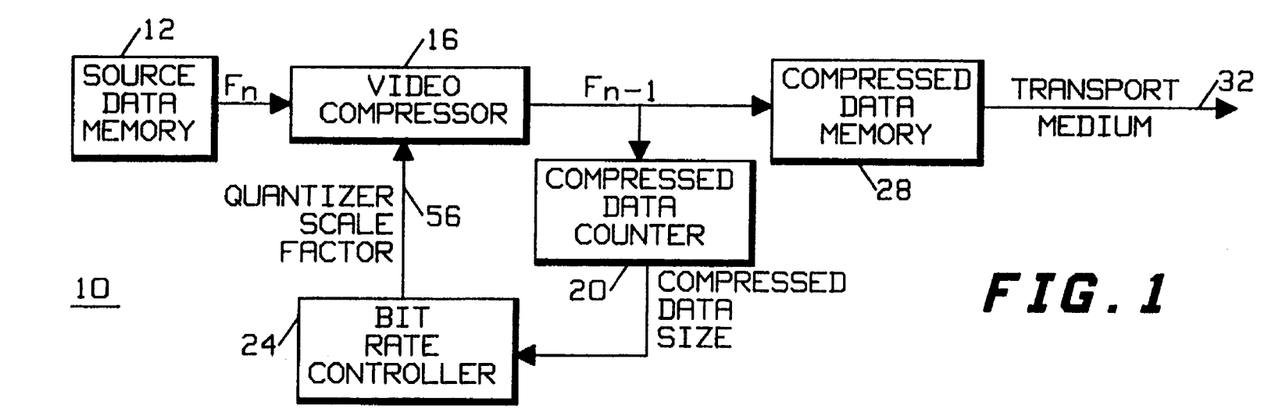
FIG. 1 is a block diagram of a compression system.

Referring to FIG. 1, a typical field-based video data compression system 10, such as a JPEG (Joint Pictures Expert Group) style system, includes a source data memory 12 which provides data to a video compressor 16. A compressed data counter 20 makes a determination of the size of the compressed data and provides this information to a bit rate controller 24. The bit rate controller makes a determination of a quantizer scale factor and provides this information to the video compressor 16. The compressed data from the video compressor 16 is provided to a compressed data memory 28 which is ultimately used as the source of data for a transport medium 32 (or storage medium).

The source data memory 12 contains the uncompressed video data. The video compressor 16 processes data from the source data memory, reduces its data volume, and stores the compressed video data into the compressed data memory 28. The compressed data counter 20 counts the number of compressed data bytes output by the video compressor 16 during each field. The bit rate controller 24 adjusts the compression parameters to control the volume of data output by the video compressor 16. Compressed video data is moved via the transport medium 32 to other locations.

Figure 2:
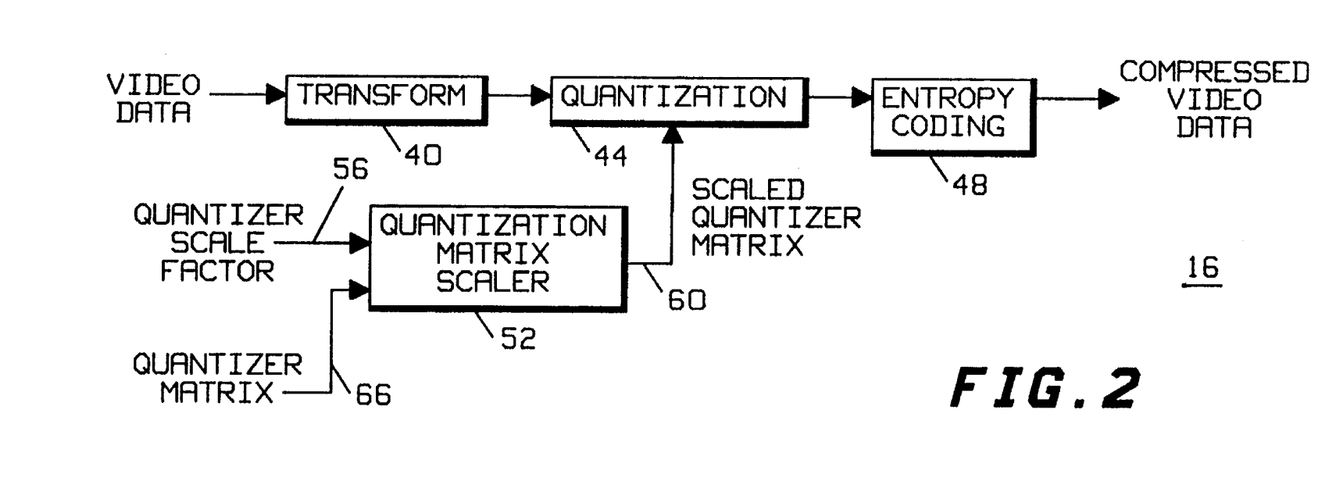
FIG. 2 is a block diagram of a JPEG style compressor.

In a JPEG style video compressor such as 16, compression takes place in three stages: transform 40, quantization 44, and entropy coding 48. In the transform stage, video data is transformed from time domain information into a frequency domain representation using, for example, a discrete cosine transform or fast Fourier transform or the like. This frequency domain information is represented as a matrix. In the quantization stage 44, transformed data is divided by a value from scaled quantizer matrix produced by quantization matrix scaler 52. A large quantizer scale factor at 56 creates larger values in the scaled quantizer matrix at 60, and causes more information to be discarded in the quantization operation of quantizer 44. The compression ratio, defined to be the size of the source video data divided by the size of the compressed video data, is primarily determined by the value of the quantizer scale factor at 56.

Many video compression techniques, such as the JPEG compression standard, produce a compressed data stream that varies in volume depending on the complexity of the source video image. However, in many cases the compressed data stream must then be carried by some medium which has limited data carrying capacity. To prevent overflow of the transport medium, the volume of data produced by the compression technique must be controlled.

Typically, a buffer memory such as 28 is inserted between the output of the variable bit rate video compression circuitry and the input of the constant bit rate transport medium. The buffer memory is used to smooth out variations in the volume of data output by the compression circuitry. Because the buffer memory size is limited, the volume of data produced by the video compression circuitry must still be controlled to prevent buffer overflow.

For most field,based video compression systems, the amount of compression is primarily controlled by the quantization process. In this process, a matrix of transformed video data is divided by a quantization matrix at 44. Because the remainder of the division operation is discarded, information is lost and the number of bits required to represent the source data is reduced. The compressed data volume is controlled at quantization matrix scaler 52 by multiplying the quantization matrix by the quantizer scaling factor at 56. A large quantizer scaling factor increases all of the values in the quantization matrix, which results in more data being discarded in the division operation, and consequently a lower output data volume.

In most applications, the volume of data produced by the video compression circuitry must very closely match the data carrying capacity of the transport medium. To produce this precise control over data volume, an iterative process is used to pick the optimal quantizer scale factor. This iterative process requires each field of data to be compressed multiple times. For a particular field of video data, typically an initial quantizer scale factor is selected, and compression is performed. The volume of data produced is compared to the desired data volume, and the quantizer scale factor is adjusted. If the target data volume was exceeded, the quantizer scale factor is increased, and vice versa. This process is repeated several times until an optimal quantizer scale factor is found for a particular field. The object is to closely match the capacity of the transport medium so that the best quality picture is obtained consistent with the limitations of the transport medium.

Iteration to produce an optimal quantizer scale factor provides precise control over compressed data volume, but can become impractical in real-time systems. In a real-time system, every field must be compressed in a time no longer than one field time. If iteration is used, then a particular field must be compressed several times during one field time, or several compression circuits must be used in parallel. In either case, the system cost can be high due to the need for extremely high speed processing or multiple processors (compressors) are needed to implement the compression.

SUMMARY OF THE INVENTION

It is an object of the present invention to provide an improved compression method suitable for use in real time video to produce an approximately constant data rate.

It is a feature that the present invention is simple to implement.

It is an advantage that the present invention provides approximately constant rate output data.

It is a further advantage that one embodiment of the present invention provides detection of scene changes.

These and other objects, advantages and features of the invention will become apparent to those skilled in the art upon consideration of the following description of the invention.

The present invention relates to a one pass adaptive bit rate control method particularly useful for video data. Data from a previous video field is used to calculate a quantizer scale factor for use in compressing a current video field. Large changes in compressed data size is used to detect scene changes. When a scene change is detected, a marker is inserted into the compressed data stream in place of the compressed field. An interpolated field is substituted during decompression for the scene change marker.

To avoid confusion in terminology, for purposes of this discussion:

$F_n$ refers to the current frame (number n) being processed;

$S_n$ refers to the size of the compressed field $F_n$;

$Q_n$ refers to the quantization factor computed from and used to compress field $F_n$.

In one aspect of the present invention, a method for compressing a sequence of fields of video data $F_n$ where n is a field counting number, includes the steps of: (a) establishing a desired data size $S_{desired}$ for fields of compressed data; (b) calculating a quantization factor $Q_n$ from the size $S_{n-1}$ resulting when a field of data $F_{n-1}$ was compressed; (c) compressing a field of data $F_n$ using the quantization factor $Q_n$; and (d) repeating steps (b) and (c) for each value of n for the sequence of fields of video.

In another aspect of the invention, a method for compressing a sequence of fields of video data $F_n$ where n is a field counting number, includes the steps of: establishing a desired data size $S_{desired}$ for fields of compressed data; calculating an initial quantization factor $Q_1$ as:

$$Q_1 = \left( \frac{k}{S_{desired}} \right)^2$$

where k is a constant; compressing the field $F_1$ using an initial quantization factor $Q_1$; for each n>1, calculating a quantization factor $Q_n$ using $$Q_n = Q_{n-1} \cdot \left( \frac{S_{n-1}}{S_{desired}} \right)^2$$

and; for n>1, compressing each field of data $F_n$ using the quantization factor $Q_n$.

In another aspect of the present invention, a method for compressing a sequence of fields of video data $F_n$ where n is a field counting number, includes the steps of: establishing a desired data size $S_{desired}$ for fields of compressed data; calculating an initial quantization factor $Q_1$ for compressing field $F_1$ as:

$$Q_1 = \left( \frac{k}{S_{desired}} \right)^2$$

where k is a constant; compressing the field $F_1$ using the quantization factor $Q_1$; for n>1, calculating a quantization factor $Q_n$ for each field of data $F_n$ using $$Q_n = \text{MAX} \left[ Q_{n-1} \cdot \left( \frac{S_{n-1}}{S_{desired}} \right)^2, C \right]$$

where c is a constant; and for n>1, compressing each field of data $F_n$ using the quantization factor $Q_n$.

In yet another aspect of the invention, a method for compressing a sequence of fields of video data $F_n$ where n is a field counting number, includes the steps of: establishing a desired data size $S_{desired}$ for fields of compressed data; establishing an initial quantization factor $Q_1$ for compressing field $F_1$; compressing the field $F_1$ using the quantization factor $Q_1$; for n>1, establishing a quantization factor $Q_n$ for each field of data $F_n$; and for n>1, compressing each field of data $F_n$ using the quantization factor $Q_n$ calculated using the actual data size $S_{n-1}$ obtained when field $F_{n-1}$ was compressed.

A method, according to the invention, for compressing a sequence of fields of video data $F_n$ where n is a field counting number, includes the steps of: establishing a desired data size $S_{desired}$ for fields of compressed data; establishing an initial quantization factor $Q_1$ for compressing field $F_1$; compressing the field $F_1$ using the quantization factor $Q_1$; for n>1, establishing a quantization factor $Q_n$ for each field of data $F_n$; for n>1, compressing each field of data $F_n$ using the quantization factor $Q_n$ calculated using an actual data size $S_{n-1}$ obtained when field $F_{n-1}$ was compressed; and for n>1, each field's compressed data size $S_n$ is compared with the previous field's compressed data size $S_{n-1}$ and if the difference between $S_n$ and $S_{n-1}$ is greater than a predetermined threshold, then a substitute field or scene change marker is substituted for field $F_n$.

With the present invention, precise control of compressed data volume is not needed because a large buffer memory can absorb data volume fluctuations. This invention uses data from the previous field to calculate a quantizer scale factor for the current field. The calculation is computationally simple, and can be performed very quickly. Adequate control of compressed data volume is achieved with minimum complexity and in a manner suitable for use in a real time system.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Referring to FIG. 1, the present invention utilizes a new method of bit rate control within bit rate controller 24. Otherwise, the basic block diagram is similar to that described above. The value of the quantizer scale factor at 56 is set by the bit rate controller 24. While each field is being compressed, the compressed data counter 20 counts the number of bytes of compressed video data that are generated. After the field has been compressed, the bit rate controller 24 uses the field's quantizer scale factor, the compressed video data size generated by using that scale factor, and the desired compressed video data size to calculate a new quantizer scale factor. This new quantizer scale factor is used by the compressor to create a new scaled quantizer matrix in the standard manner, which is used for the next field. That is, the scale factor used for compressing the current field is that calculated from the scale factor which is required for the preceding field. All of this processing is performed in the interval between two fields. Of course, the quantization information may be encoded for transmission to the receiving end to permit proper decoding if the particular compression technique requires such.

Figure 3:
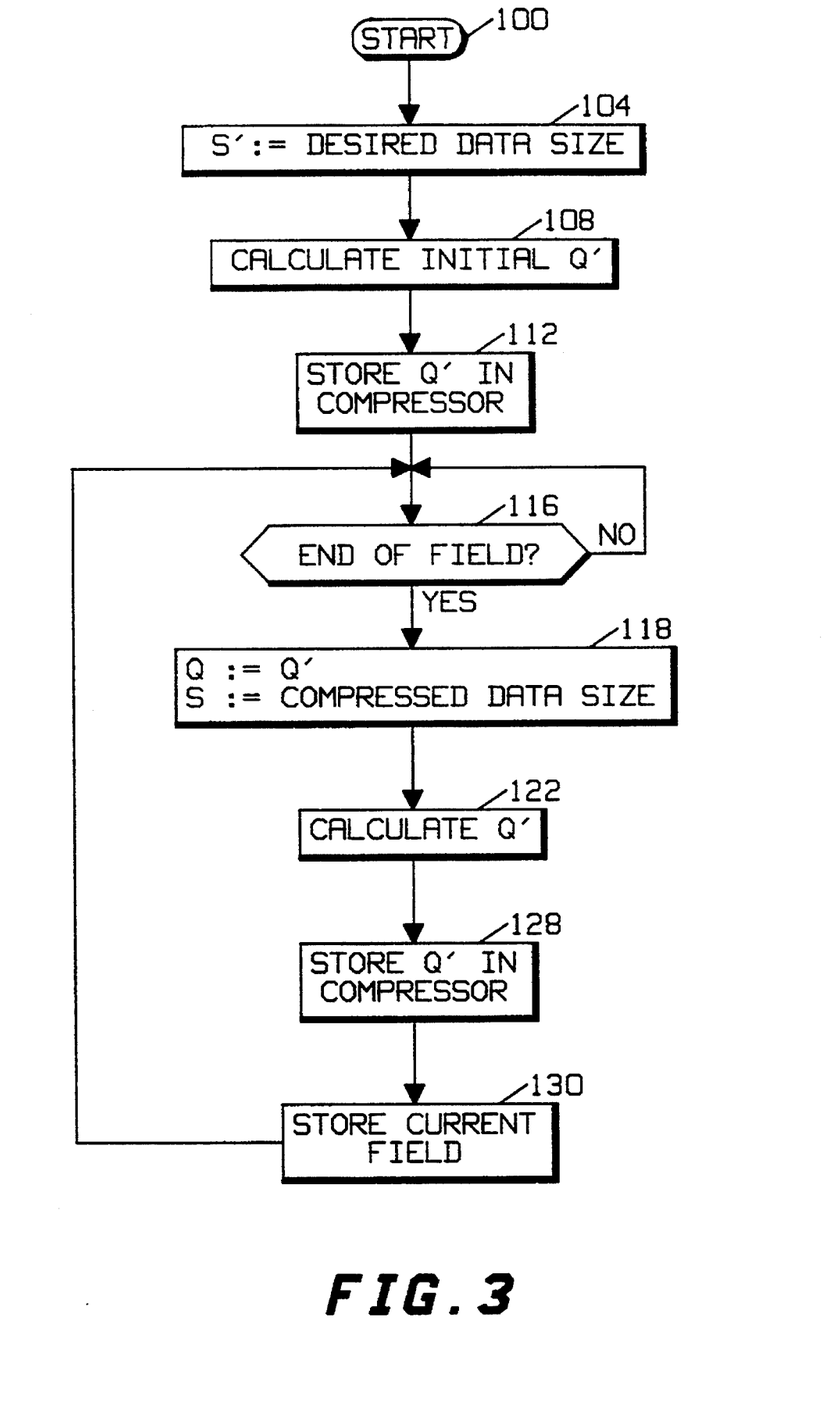
FIG. 3 is a flow chart of the compression process used in the present invention.

The process used in this invention is described with reference to FIG. 3 starting at step 100. In this method of bit rate control, the value of desired data size variable $S_{desired}$ is initially set at step 104 to the desired field compressed data size. Then, an initial value of the quantizer scale factor Q' is calculated at 108, and this value is stored in the compressor at 112. After the entire field has been compressed as determined at step 116, the value of previous field quantizer scale factor variable Q is set to the current value of Q', and the compressed data size S is retrieved from the compressed data counter at 118. Using these values, a new quantizer scale factor Q' is calculated at 122, and this value is stored into the compressor at 128 and used to compress the next field. The current field is stored at 130 in compressed data memory 28 or otherwise processed. This process repeats indefinitely.

After every field has been compressed, the previous quantizer scale factor and the resulting compressed data size are used to calculate a new quantizer scale factor. The algorithm used for this calculation is very easy to calculate, yet provides good control of compressed data size. This algorithm was empirically derived from observations of the relationship between quantizer scale factor and resulting compressed data size for many different fields of video.

The initial quantization factor used to compress the first field of data is derived empirically. In the preferred embodiment, the formula for initial quantizer scale factor is shown in Equation 1, $$Q' = \left( \frac{35000}{S_{desired}} \right)^2 \quad \text{EQUATION 1}$$

where Q' is the initial quantizer scale factor used to compress the first field of data, and $S_{desired}$ is the desired compressed data size. Other initial quantization factors may also be selected if desired or if a good factor is known for the initial field.

The general formula for subsequent quantizer scale factors is shown in Equation 2, $$Q' = Q \cdot \left( \frac{S}{S_{desired}} \right)^2 \quad \text{EQUATION 2}$$

where Q' is the new quantizer scale factor, $S_{desired}$ is the desired compressed data size, Q is the previous quantizer scale factor, and S is the resulting compressed data size.

As a practical matter, it is desirable to limit changes in the quantizer scale factor. For example, a flat black video image contains almost no information, and will naturally result in a very small compressed data size. When compressing a sequence of flat black images, because $S_{desired}$ is larger than S, the value of Q' will become very small. This is not only wasteful of transport medium bandwidth, but will result in an extremely large compressed data size if the scene changes to a complicated image. Therefore, Equation 1 and Equation 2 should, as a practical matter, be modified so that Q' has a floor value, as shown in Equation 3 and Equation 4, $$Q' = \text{MAX} \left[ \left( \frac{35000}{S_{desired}} \right)^2, C \right] \quad \text{EQUATION 3}$$

$$Q' = \text{MAX} \left[ Q \cdot \left( \frac{S}{S_{desired}} \right)^2, C \right] \quad \text{EQUATION 4}$$

where C is a constant. The value of C depends on the value of $S_{desired}$. To prevent Q' from becoming too small, we can use Equation 1 to develop a (fairly arbitrary) value for C. The equation shown as Equation 5 has been found suitable for a wide range of images.

$$C = 0.5 \cdot \left( \frac{35000}{S_{desired}} \right)^2 \quad \text{EQUATION 5}$$

Thus, for a sequence of video fields $F_n$, where n is a field number, the quantization factor $Q_n$ which is used for compression of the current field of data $F_n$ is calculated as follows to obtain a data size of approximately $S_{desired}$:

$$Q_n = \text{MAX} \left[ Q_{n-1} \cdot \left( \frac{S_{n-1}}{S_{desired}} \right)^2, C \right] \quad \text{EQUATION 6}$$

where:

$$C = 0.5 \cdot \left( \frac{35000}{S_{desired}} \right)^2 \quad \text{EQUATION 7}$$

and where $S_{n-1}$ is the actual size obtained after compression of the previous field of video data $F_{n-1}$ using quantization factor $Q_{n-1}$. The initial field $F_1$, is compressed using quantization factor $Q_1$ as follows:

$$Q_1 = \text{MAX} \left[ \left( \frac{35000}{S_{desired}} \right)^2, C \right] \quad \text{EQUATION 8}$$

which could be generalized to:

$$Q_1 = \text{MAX} \left[ \left( \frac{k}{S_{desired}} \right)^2, C \right] \quad \text{EQUATION 9}$$

where k is a constant.

In the case where the bounds are not needed for the quantization factor values, the quantization factor for field $F_n$ can be calculated as in EQUATION 2, which would become:

$$Q_n = Q_{n-1} \cdot \left( \frac{S_{n-1}}{S_{desired}} \right)^2 \quad \text{EQUATION 10}$$

Note that each field is compressed using a quantizer scale factor calculated from the compressed data size of the previous field of data. Thus, the quantization factor is continuously adjusted to provide a good approximation of the quantization factor needed for the current video information. For video images that are either unchanging or only changing slightly in complexity, this technique provides good compression performance, and approximates the desired compressed data size. This bit rate control method takes advantage of the fact that most video fields are very similar to the temporally previous video field. The present one-pass non-iterative method of bit rate control is advantageous because parallel compressors are unnecessary and compression does not have to be performed faster than real time.

However, a one-pass bit rate control mechanism cannot generally perfectly control compressed data size if the complexity of consecutive video fields is radically different, such as at scene changes. Because every field is compressed using a quantizer scale factor calculated from the compressed data size of the previous field, the first field of a scene change can be overcompressed or undercompressed. Therefore, this bit rate control mechanism preferably uses a compressed data buffer that is large enough to prohibit a single undercompressed video field from causing a buffer overflow. If a single overcompressed or undercompressed video field is visually objectionable, then corrective measures, such as field replication as discussed below, can be taken to reduce the problem.

This invention uses the compression results from the previous field to calculate a quantizer scale factor for the current field. The desired data volume is achieved because, in general, consecutive fields of video data are similar in complexity. However, consecutive fields of video data can be very different at a "scene change." If the complexity of the current field's video image is higher than that of the previous field, then the volume of compressed data created will be higher than the desired amount. Conversely, if the complexity of the current field's video image is lower than that of the previous field, then the volume of compressed data will be lower than the desired amount. In either case, because this field's compression results will be used to calculate the quantizer scale factor, the volume of compressed data output for the next field will be close to the desired size.

Figure 4:
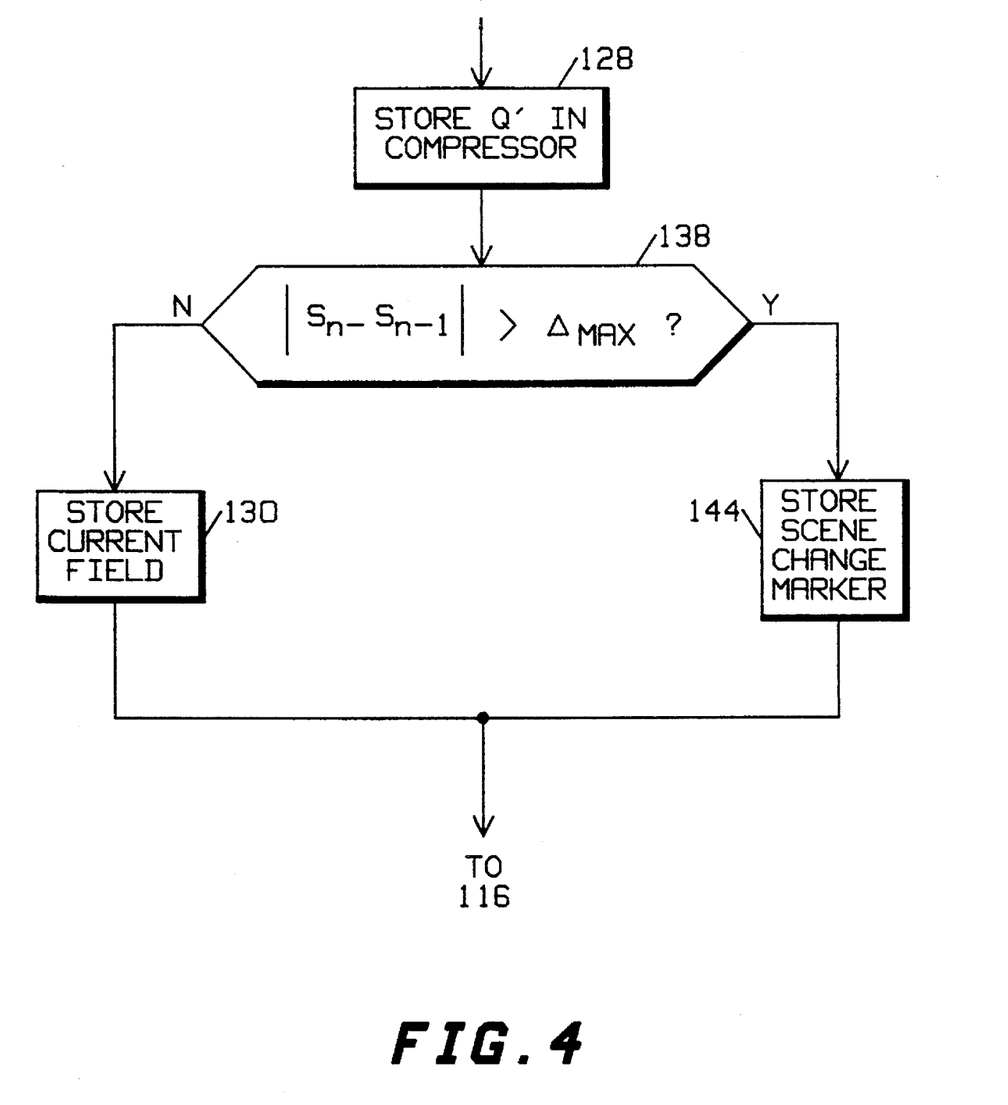
FIG. 4 is a flow chart describing a compression process using scene change detection.

In many video applications, it is desirable to automatically find scene changes. The large deviations of the actual compressed data volume from the expected compressed data volume can be used to detect scene changes as illustrated in FIG. 4. In this figure, which constitutes a modification of FIG. 3, the change in compressed field size is examined at step 138. For every field, the actual compressed data volume is compared to the expected compressed data volume. The expected size is that of the previous compressed field. Thus, if $S_n$, the size of the current field, is much larger or smaller than the previous field $S_{n-1}$, so that the absolute value of the difference in size is greater than some threshold value $\Delta_{max}$, then it can be assumed that the video complexity suddenly changed, and that a scene change has been encountered. When this threshold is exceeded, the process goes to step 144 in which a marker indicating that a scene change has taken place is stored in the compressed data memory 28 in place of the compressed field. When the threshold $\Delta_{max}$ is not exceeded, control passes to step 130 where the compressed field is stored in memory 28.

In FIG. 4, at step 138, the size of the resulting compressed data is compared with the size of the previous data field by subtracting $S_{n-1}$ from $S_n$ and comparing the absolute value of the result with a maximum difference value $\Delta_{max}$. If the difference is greater than $\Delta_{max}$, then it can be presumed that a scene change has taken place and the quantization factor for field $F_{n-1}$ is not appropriate to provide suitable compression. Corrective action is taken in the decoding of the compressed data as shown in FIG. 5.

Figure 5:
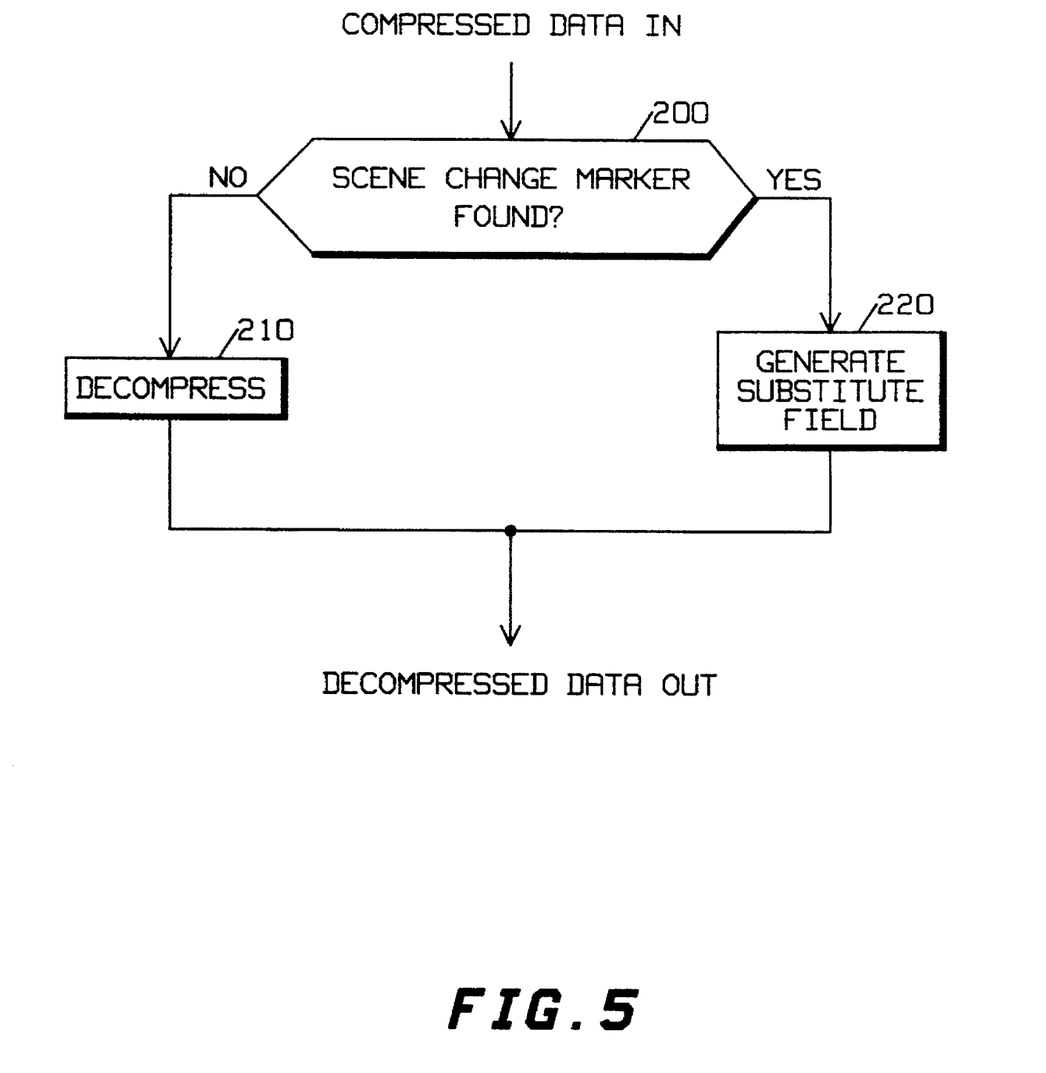
FIG. 5 is a flow chart of a decompression process according to the present invention.

Referring to FIG. 5, the decoding process for compressed data generated as illustrated above is described. In this arrangement, compressed data is examined at step 200 to see if a scene change marker is present. If not, the data is decompressed in a normal fashion at step 210 to produce output decompressed data. In the event a scene change marker is found at step 200, a substitute field of data is generated at step 220 and provided as an output.

The substitute field of data can be generated in a number of ways. In one embodiment, the previous field of decompressed video can be repeated at step 220. In another embodiment, field interpolation can be used to generate the substitute field. Field interpolation can create an "odd" field from an "even" field or vice versa. It can also be used to reduce image bounce in slow-speed play, and to double vertical resolution under certain circumstances. In the present invention, a vertical averaging filter is used to carry out the interpolation using the following equations:

$$xhigh_n = \frac{x_n + x_{n-1}}{2} \quad \text{EQUATION 11}$$

$$xLow_n = \frac{x_{n+1} + x_n}{2} \quad \text{EQUATION 12}$$

These equations calculate a synthetic pixel which is spatially midway between the two existing pixels in actual video fields. EQUATION 11 above calculates the spatially higher line while EQUATION 12 above calculates the spatially lower line. Other techniques could also be used to generate the substitute field, including deletion of the field.

The present invention can be implemented in any number of ways without departing from the present invention. For example, a programmed processor can be used to carry out all of the processing described. Alternatively, a hardware implementation using lookup ROMs to store values of the quantization factor corresponding to particular sizes of the compressed data be used. Of course, a hardware implementation using two multipliers and a divider can also be considered.

The invention is preferably implemented using a combination of both hardware and software. All of the compression processing, including quantizer scaling and quantization, is preferably implemented using an application-specific integrated circuit. The quantizer scale factor calculation is preferably performed by a programmed processor such as a microprocessor. The buffer memory is implemented in hardware. Of course, in the alternative, the quantizer scale factor calculation can be performed in hardware, using either special purpose multipliers and dividers, or using lookup tables as suggested above. Other variations will occur to those skilled in the art after consideration of the present invention. Those skilled in the art will also appreciate that a wide range of constants k and c can be expected to be functional in the present invention and that those constant values presented are merely illustrative of values which have been experimentally determined to function reasonably well over a wide range of video input.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for compressing a sequence of fields of video data $F_n$ in a video compressor, where n is a field counting number, comprising the steps of:

(a) establishing a desired data size $S_{desired}$ for fields of compressed data;

(b) calculating a quantization factor $Q_n$ in a bit rate controller for a field of data $F_n$ to achieve said desired data size, said quantization factor $Q_n$ being calculated from an actual data size $S_{n-1}$ obtained when a preceding field $F_{n-1}$ was compressed by said video compressor;

(c) compressing field $F_n$ in said video compressor using the quantization factor $Q_n$; and (d) repeating steps (b) and (c) for each value of n for said sequence of fields of video.

2. The method of claim 1, wherein an initial quantization factor used for compressing field $F_1$ is calculated as:

$$Q_1 = \left( \frac{k}{S_{desired}} \right)^2$$

where k is a constant.

3. The method of claim 2, wherein said quantization factors $Q_n$ for n>1 are calculated in step (b) by:

$$Q_n = Q_{n-1} \cdot \left( \frac{S_{n-1}}{S_{desired}} \right)^2$$

4. The method of claim 2, wherein said quantization factors $Q_n$ for n>1 are calculated by:

$$Q_n = \text{MAX} \left[ Q_{n-1} \cdot \left( \frac{S_{n-1}}{S_{desired}} \right)^2, C \right]$$

where c is a constant.

5. The method of claim 4, wherein $$C = 0.5 \cdot \left( \frac{35000}{S_{desired}} \right)^2$$

6. The method of claim 1, further comprising the step of comparing, using a bit rate controller, the difference between size factors $S_n$ and $S_{n-1}$ with a maximum value $\Delta_{max}$ to determine if a scene change has taken place.

7. The method of claim 6, further comprising the step of substituting a scene change marker in place of a field of video when said scene change takes place.

8. The method of claim 7, further comprising the steps of: decompressing said compressed fields and generating a substitute field for replacing said scene change marker.

9. The method of claim 8, wherein said step of generating a substitute field includes generating an interpolated field for field $F_n$.

10. A method for compressing a sequence of fields of video data $F_{n-1}$ in a video compressor, where n is a field counting number, comprising the steps of:

establishing a desired data size $S_{desired}$ for fields of compressed data;

calculating an initial quantization factor $Q_1$ for compressing field $F_1$ as:

$$Q_1 = \left( \frac{k}{S_{desired}} \right)^2$$

where k is a constant;

compressing said field $F_1$ in said video compressor using said quantization factor $Q_1$;

for n>1, calculating a quantization factor $Q_n$ in a bit rate controller for compressing each field of data $F_n$ using $$Q_n = Q_{n-1} \cdot \left( \frac{S_{n-1}}{S_{desired}} \right)^2$$

and; for n>1, compressing each field of data $F_n$ using the quantization factor $Q_n$ in said video compressor.

11. The method of claim 10, wherein $$C = 0.5 \cdot \left( \frac{35000}{S_{desired}} \right)^2$$

12. The method of claim 10, wherein for n>1, each field's compressed data size $S_n$ is compared with the previous field's compressed data size $S_{n-1}$ and if the difference between $S_n$ and $S_{n-1}$ is greater than a predetermined threshold, then field $F_{n-1}$ is substituted for field $F_n$.

13. The method of claim 10, further comprising the step of comparing the difference between size factors $S_n$ and $S_{n-1}$ with a maximum value $\Delta_{max}$ to determine if a scene change has taken place.

14. The method of claim 13, further comprising the step of substituting a scene change marker in place of a field of video when said scene change takes place.

15. The method of claim 14, further comprising substituting an interpolated field in place of said scene change marker.

16. A method for compressing a sequence of fields of video data $F_n$ in a video compressor, where n is a field counting number, comprising the steps of:

establishing a desired data size $S_{desired}$ for fields of compressed data;

calculating an initial quantization factor $Q_1$ for compressing field $F_1$ as:

$$Q_1 = \left( \frac{k}{S_{desired}} \right)^2$$

where k is a constant;

compressing said field $F_1$ in said video compressor, using said quantization factor $Q_1$;

$$Q_n = \text{MAX} \left[ Q_{n-1} \cdot \left( \frac{S_{n-1}}{S_{desired}} \right)^2, C \right]$$

for n>1, calculating a quantization factor $Q_n$ in a bit rate controller for each field of data $F_n$ using where C is a constant; and for n>1, compressing each field of data $F_n$ using the quantization factor $Q_n$ in said video compressor.

17. The method of claim 16, wherein $$C = 0.5 \cdot \left( \frac{35000}{S_{desired}} \right)^2$$

18. The method of claim 16, wherein for n>1, each field's compressed data size $S_n$ is compared with the previous field's compressed data size $S_{n-1}$ and if the difference between $S_n$ and $S_{n-1}$ is greater than a predetermined threshold, then field $F_{n-1}$ is substituted for field $F_n$.

19. The method of claim 16, wherein for n>1, each field's compressed data size $S_n$ is compared with the previous field's compressed data size $S_{n-1}$ and if the difference between $S_n$ and $S_{n-1}$ is greater than a predetermined threshold, then substituting a scene change marker for field $F_n$.

20. The method of claim 19, further comprising substituting an interpolated field in place of said scene change marker.

21. A method for compressing a sequence of fields of video data $F_1$ in a video compressor, where n is a field counting number, comprising the steps of:

establishing a desired data size $S_{desired}$ for fields of compressed data;

establishing an initial quantization factor $Q_1$ for compressing field $F_1$;

in said video compressor, compressing said field $F_1$ using said quantization factor $Q_1$;

for n>1, establishing a quantization factor $Q_n$ in a bit rate controller for each field of data $F_n$, where $Q_n$ is calculated from an actual data size $S_{n-1}$ obtained when field $F_{n-1}$ was compressed; and     for n>1, compressing each field of data $F_n$ in said video compressor, using the quantization factor $Q_n$.

22. The method of claim 21, wherein for n>1, each field's compressed data size $S_n$ is compared with the previous field's compressed data size $S_{n-1}$ and if the difference between $S_n$ and $S_{n-1}$ is greater than a predetermined threshold, then field $F_{n-1}$ is substituted for field $F_n$.

23. The method of claim 21, wherein for n>1, each field's compressed data size $S_n$ is compared with the previous field's compressed data size $S_{n-1}$ and if the difference between $S_n$ and $S_{n-1}$ is greater than a predetermined threshold, then substituting a scene change marker for field $F_n$.

24. The method of claim 23, further comprising substituting an interpolated field in place of said scene change marker.

25. A method for compressing a sequence of fields of video data $F_n$ where n is a field counting number, comprising the steps of:

establishing a desired data size $S_{desired}$ for fields of compressed data;

establishing an initial quantization factor $Q_1$ for compressing field $F_1$;

compressing said field $F_1$ using said quantization factor $Q_1$;

for n>1, establishing a quantization factor $Q_n$ for each field of data $F_n$, $Q_n$ being calculated from an actual data size $S_{n-1}$ obtained when field $F_{n-1}$ was compressed;

for n>1, compressing each field of data $F_n$ using the quantization factor $Q_n$; and     for n>1, comparing each field's compressed data size $S_n$ with the previous field's compressed data size $S_{n-1}$ and if the difference between $S_n$ and $S_{n-1}$ is greater than a predetermined threshold, then generating scene change marker and substituting said field change marker for field $F_n$.

26. The method of claim 25, further comprising the steps of: decompressing said compressed fields and generating a substitute field for replacing said scene change marker.

27. The method of claim 26, wherein said step of generating a substitute field includes generating an interpolated field for field $F_n$.

28. A video compression device, comprising:

a video compressor receiving a first video frame as an input and producing a first compressed video frame as an output by compressing said first video frame;

means for determining a size of said first compressed video frame;

means for generating a first quantization scale factor as a function of said size of said first compressed video frame; and     wherein, said video compressor further receives a second video frame immediately subsequent to receipt of said first video frame, and wherein said second video frame is compressed according to said first quantization scale factor to produce a second compressed video frame.

29. The device of claim 28, wherein said video compressor further comprises:

a quantization matrix scaler for generating a scaled quantization matrix from a quantizer matrix and said quantization scale factor;

a transformer for receiving said first and second video frames and transforming said first and second video frames to an alternate form of representation;

a quantizer receiving said alternate form of representation of said first and second video frames and said scaled quantization matrix, for producing a new quantizer matrix;

an entropy coder for receiving an output of said quantizer and producing said second compressed video frame;

a memory for storing said first and second frames of compressed video data;

a compressed data counter for determining said size of said frames of compressed video; and     a bit rate controller for determining said quantizer scale factor.

30. The device of claim 29, where said bit rate controller further includes:

a compression parameter adjustment to control volume of data output by said video compressor.

31. The device of claim 29, where said bit rate controller further includes:

means for detecting scene changes by comparing the said size of said first and second compressed video frames;

means for generating a scene change marker for indicating when a scene change is detected; and     wherein, said compressed video frame is replaced with said scene change marker when said scene change is detected.

32. The device of claim 28, further including:

a scene change detector for detecting scene changes by comparing said size of said first and second compressed video frames.

means for generating a scene change marker for indicating when a scene change is detected; and     wherein, said compressed video frame is replaced with said change marker when said scene change is detected.

33. A video compression device, comprising:

a video compressor receiving a first video frame as an input and producing a first compressed video frame as an output by compressing said first video frame;

a counter for determining a size of said first compressed video frame;

a bit rate controller generating a first quantized scale factor being generated as a function of said size of said first compressed video frame; and     wherein, said video compressor further receives a second video frame immediately subsequent to receipt of said first video frame, and wherein said second video frame is compressed according to said first quantization scale factor to produce a second compressed video frame.

\* \* \* \* \*